United States Patent Office 3,690,884

Patented Sept. 12, 1972

3,690,884

PHOTOGRAPHIC DRY COPYING PROCESS

Maria Scheibitz and Anita von Konig, Leverkusen, Helmut Kampfer, Cologne, Dietmar Mayer, Leverkusen, Klaus Sasse and Gunter Kolb, Cologne, Hans Ludwig Honig, Leverkusen, and Werner Meiser, Wuppertal-Elberfeld, Germany, assignors to Agfa-Gevaert Aktiengesellschaft, Leverkusen, Germany No Drawing. Filed Apr. 20, 1970, Ser. No. 30,337
Claims priority, application Germany, May 24, 1969, P 19 26 658.1
Int. Cl. G03c 5/54
U.S. Cl. 96—29 14 Claims

ABSTRACT OF THE DISCLOSURE

Photographic prints can be produced by imagewise exposure of a light-sensitive layer containing a transferable image producing compound and a light-sensitive compound capable of reacting upon exposure with an image producing compound to yield a non-transferable reaction product. The exposed layer is heated and contacted with an image receiving layer containing compounds capable of reacting with the heat transferred image producing compound to form the image dye.

The light-sensitive compound is an organic azido compound and the image producing transferable compound a derivative of hydroxyl amine.

The invention relates to a photographic dry copying process for making reproductions of both black-and-white and colored graphic originals and to a light-sensitive material for carrying out this process.

It is known that certain organic azides are light-sensitive, e.g. organic azides which are used for the photo-cross-linking of polymers. In addition, organic azides which on exposure decompose into products which in turn react with other compounds, such as phenothiazine, to yield dyes or which enable oxidative coupling reactions to be carried out by the principle of color-forming development in color photography, have been described.

The known light-sensitive materials of the type mentioned above which can be used for producing negative copies, have however numerous disadvantages. For example, their sensitivity to light is unsatisfactory particularly in the visible region of the spectrum, so that unduly long copying times are necessary and the reproduction of colored originals gives rise to difficulties. In addition, the final images remain sensitive to light, and they can only be stabilized against day-light by a very complicated after-treatment.

Furthermore, processes for the production of copies are known in which the copies are produced by the imagewise exposure of a light-sensitive layer which contains a light-sensitive compound and an image producing compound which can be transferred to an image receiving layer, the image producing compound in the unexposed areas being converted into a non-transferable compound, and the exposed layer being brought into contact with an image receiving layer, which contains compounds which react with the image producing compound to form colored compounds, the layers which are in contact being heated to a temperature at which the image producing compound is transferred from the unexposed areas of the light-sensitive layer to the image receiving layer.

This process includes, e.g. the so-called heat development process in which light-sensitive materials, which include a silver halide emulsion layer and which contain a photographic developer, are used. After exposure, development is carried out by heating in contact with an image receiving layer which contains materials which yield dyes by reaction with the developer. The developer is transferred from the unexposed areas of the light-sensitive layer to the image receiving layer at elevated temperature, a colored image being produced in these areas of the receiving layer.

One disadvantage of these known heat development or developer sublimation process is that the silver halide emulsion layers which contain developer are insufficiently stable in storage, this instability being due to these layers containing materials which increase the residual moisture of the layers, such as salts which form hydrates, or glycols, and being due to the increased sensitivity to oxidation of most of the developer materials in these weak or unhardened emulsion layers, which have a high residual moisture content.

The process which is described in U.S. Pat. No. 3,094,-417 also belongs to this type of copying process. In the process according to the said patent specification, the light-sensitive layers which are used contain a volatile compound and a dye. On exposure, the volatile compound is converted into a non-volatile product. On subsequent heating, this compound can be transferred from the unexposed areas to a receiving material where it reacts with a silver salt (silver behenate) to form a colored positive image.

The last mentioned process is disadvantageous since the light-sensitivity of the layers is comparatively low.

It is among the objects of the present invention to provide a photographic dry copying process and light-sensitive materials suitable for this process, which have sufficient sensitivity to light and which enable multicolored and black-and-white images to be produced.

We now have found a process for the production of copies by imagewise exposure of a light-sensitive layer which contains a light-sensitive compound and an image producing compound which is transferable to an image receiving layer, the image producing compound in the exposed areas being converted into a non-transferable compound, the exposed layer being brought into contact with an image receiving layer which contains compounds which react with the image producing compound to form colored compounds, and the layers in contact being heated to a temperature at which the image producing compound is transferred from the unexposed areas of the light-sensitive layer to the image receiving layer, wherein the light-sensitive layer contains as the light-sensitive compound an organic azide, and as the image producing transferable compound a hydroxylamine derivative having a melting point of above 50° C. which is transferable at a temperature of between 80 and 200° C.

Azides suitable for the light-sensitive layer are light-sensitive aryl azides or heterocyclic azides which contain at least one azido group, and in which the azido group is attached to the aromatic ring either directly or via a carbonyl or sulfonyl group. The light-sensitive azido compounds may be monomers or polymers. The choice of light-sensitive azido compounds will depend on the requirements of the particular reproduction process. The most suitable azides for a particular process can easily be found by tests customarily employed in the art.

Heterocyclic azides of the following general formula have been found to be particularly suitable:

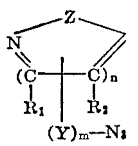

wherein:

Z=the ring members necessary for completing a 5- or 6-membered N-containing heterocyclic ring, e.g. an oxazole, thiazole, selenazole, imidazole, pyridine, pyrrole or pyrimidine ring, which ring may contain a fused ring of the phenyl of naphthyl series;

Y=arylene, preferably a phenylene ring, or a phenylene-carbonyl methylene group, the phenylene ring may contain further substituents such as alkyl or alkoxy, both preferably containing up to 3 carbon atoms, hydroxyl, halogen such as chlorine or bromine, etc.;

$R_1$ or $R_2$=hydrogen, a saturated or an olefinically unsaturated aliphatic group containing preferably up to 5 carbon atoms, aryl, especially a ring of the phenyl series, amino which may be substituted with alkyl or acyl, halogen such as chlorine or bromine, hydroxyl, alkoxy containing preferably up to 5 carbon atoms, and carboxyl or esterified carboxyl, especially carboxyl which has been esterified with aliphatic alcohols, or carbamoyl, sulfo, sulfonamido or nitril;

$R_1$ and $R_2$ may represent the ring members required for completing a fused benzene or naphthalene ring;

$m$=0 or 1; and $n$=0 or 1.

Light-sensitive compounds of the 9-azido-2,3-benzoacridine, 4-azidoquinoline or 9-azidoacridine series are especially suitable. These compounds all have the same basic structure. They differ from each other merely by a fused benzene ring. Substitution products of these basic compounds may also be used, e.g. those which are substituted alkyl, preferably with alkyl containing up to 6 carbon atoms such as methyl, ethyl, propyl or butyl, alkoxy also preferably containing 6 carbon atoms, amino, mono- or di-alkylamino, the alkyl groups of which also preferably containing up to 6 carbon atoms, halogen such as chlorine or bromine, or nitro, nitrile, carboxyl or esterified carboxyl.

Phenyl or naphthyl azides or carbonyl or sulfonyl azides are also especially suitable. Arylazides of the type in which two phenyl or naphthyl rings are joined together by one or more vinylene groups, e.g. stilben-azides, have been found to be particularly suitable. In these compounds, the chain formel by the vinylene groups may also be interrupted by carbonyl groups.

Suitable azides are summarised in the following table:

TABLE 1

(1) p-Methoxybenzenesulfazide
(2) fluorenone-2,7-disulfazide (decomposition 161–162° C.)
(3) 2,3-diazidonaphthoquinone-(1,4)
(4) 2,4-diazido-6-methylpyrimidine
(5) 2-azidobenzoxazole
(6) 2-azidobenzothiazole
(7) 2-azidomethylene-3-ethylrhodanine (M.P. 108–109° C.)
(8) 2-azidomethylene-3-phenylrhodanine (M.P. 119–121° C.)
(9) 4-azidoquinoline
(10) 4-azidoquinaldine
(11) 2-methyl-3-phenyl-4-azidoquinoline
(12) 4-azido-7-nitroquinoline
(13) 2-methyl-4-azido-7-dimethylaminoquinoline
(14) 9-azidoacridine
(15) 2-chloro-9-azidoacridine
(16) 2-methoxy-6-chloro-9-azidoacridine
(17) 2-methyl-9-azidoacridine
(18) 2-nitro-9-azidoacridine
(19) 3-dimethylamino-9-azidoacridine
(20) 9-azido-2,3-benzoacridine
(21) 9-azido-3,4-benzoacridine
(22) 9-azido-4-carbamoylacridine (decomposition 230° C.)
(23) 9-azido-2-carbethoxyaminoacridine (M.P. 172° C.)
(24) 9-azido-1,2,3,4-tetrahydroacridine
(25) 2,6-diphenyl-4-azidopyrimidine
(26) 1,4-bis-[2-(4-azidobenzoyl)-vinyl]-benzene
(27) bis[4-azidostyryl]-ketone
(28) 2,5-bis-[4-azidobenzylidene]-cyclopentanone
(29) 2,5-bis-[4-azidobenzylidene]-2,5-dihydrothiophene-S-dioxide
(30) 2,6 - bis-[3-azidobenzylidene]-cyclohexanone (M.P. 80–85° C.)
(31) [3-azidostyryl]-[4-azidophenyl]-ketone (M.P. 86–88° C.)
(32) 4-azidocinnamic acid anilide
(33 1,6-bis-[4-azidophenyl]-hexatriene-1,3,5)
(34) 4-azidobenzophenone
(35) 2,6 - bis-[4-azido-$\gamma$-chlorocinnamylidene]-cyclohexanone (decomposition 140–148° C.)
(36) 1,2 - bis-[4-azidobenzoyl]-ethylene (decomposition 136° C.)
(37) 2,6-bis-[4-azidobenzylidene]-cyclohexanone
(38) 2-[4-azidobenzoylmethylene]-$\alpha$-naphthothiazole
(39) 2-p-toluenesulfamido-9-azidoacridine
(40) 2-benzoylamino-9-azidoacridine.

The above azides are prepared by known methods; compounds 1 to 25 and 39, 40 e.g. are prepared by reacting the corresponding halogen compounds with sodium azide, and compounds 26 to 38 are prepared by condensation of aldehydes with active methylene compounds. Another useful process for their preparation is the Sandmeyer reaction.

Reducing hydroxylamine derivatives having a melting point of above 50° C. which are transferable in the temperature range of from 80 to 200° C. are suitable for use as the image producing compounds. Particular utility is exhibited by N-acylhydroxylamines, especially those of the following formula:

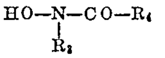

in which $R_3$ represents hydrogen or alkyl containing preferably up to 4 carbon atoms and $R_4$ represents alkoxy containing up to 5 carbon atoms, carboxy preferably a phenyloxy group, amino or alkylamino group, preferably containing up to 3 carbon atoms, or arylamino especially a phenyl amino group in which the phenyl ring may carry further substituents, e.g. halogen such as fluorine, chlorine or bromine, alkyl containing preferably up to 3 carbon atoms, alkoxy having preferably up to 3 carbon atoms alkoxy, nitril and the like.

The compounds shown in the following table have been found to be suitable:

TABLE 2

(1) N-methyl-N-morpholinomethylhydroxylamine
(2) N-allyl-N'-hydroxyurea
(3) N-ethyl-N'-hydroxyurea
(4) N-phenyl-N'-hydroxyurea
(5) N-[3,4-dichlorophenyl]-N'-hydroxyurea
(6) N-$\alpha$-naphthyl-N'-hydroxyurea
(7) N-hydroxyurea
(8) N-hydroxycarbamic acid phenyl ester (9) N-[3,4-dichlorophenyl]-N'-hydroxy-N'-methylurea
(10) N-phenyl-N'-hydroxy-N'-methylurea
(11) 1,1,3-trihydroxylamino-3-phenyl-propanol
(12) α-hydroxylaminobutyric acid
(13) N-(4-chlorophenyl)-N'-hydroxy-N'-methylurea.

The above compounds are known per se and their method of preparation can be found in the literature, especially in the following German Auslegeschriften: 1,127,344 and 1,129,151.

The light-sensitive layers contain at least one of the light-sensitive azides in quantities of from 0.1 to 1.5 g./m.$^2$ and one or more image producing compounds in quantities of from 0.02 to 0.5 g./m.$^2$. This range of concentration has been found suitable, although concentrations outside this range may, of course, also be employed. The concentration depends mainly on the requirements of the particular reproduction process.

To produce the light-sensitive layer, azides and image producing compounds may be suspended or dissolved in solvents and mixed with a film-forming binding agent and thereafter applied to the layer support.

The usual natural or synthetic film-forming polymers are suitable as binding agents for the light-sensitive layer, e.g. proteins, especially gelatin, cellulose derivatives, especially cellulose ethers, cellulose esters or carboxymethyl cellulose, alginic acid and its derivatives, starch ether or gallactomannane, polyvinyl alcohol, polyvinyl pyrrolidone, polyvinyl chloride, copolymers of vinyl chloride and vinyl acetate, polyvinyl acetate or completely or partly saponified polyvinyl acetate or copolymers of vinyl acetate, for example with olefines such as ethylene or propylene and copolymers of monomers of acrylic- or methacrylic acid or derivatives thereof such as esters, amides or nitriles, terpene- and cumarone- indene-resins, etc. The light-sensitive layers may be used as self-supporting layers or applied to a support. Suitable supports are e.g. paper, especially baryta-coated or polyolefine-coated, more particular polyethylene-coated paper and cellulose esters, e.g. cellulose triacetate, polyesters, especially those based on ethylene terephthalate, glass etc.

The image receiving material advantageously consists of an image receiving layer applied to a suitable support. Substantially the same substances as those described above for the light-sensitive material are suitable as binding agent for the image receiving layer or as the layer support.

When choosing a binder for the light-sensitive layer and the image receiving layer, care should be taken to ensure that the layers will not stick at elevated temperature. These difficulties, however, are well known from other transfer processes, e.g. the silver salt diffusion process or heat development processes, and can easily be solved by making use of the experience gained in these known fields.

The image receiving layer contains compounds which should be insensitive, or as restricted as possible in their sensitivity, to visible light under the conditions of the process of the invention, and which react with the transferred image producing compounds to form colored products. Numerous compounds have been found suitable for this purpose. Chemically, these compounds belong to a wide variety of classes so that their systematic chemical classification is not possible. However, suitable compounds or suitable combinations of an image producing compound arranged in the light-sensitive layer and of the reactant for the image-forming reaction in the image receiving layer can be sufficiently clearly defined by simple laboratory tests customarily employed in the art. Thus, for example, the two reactants must react when briefly heated for a few seconds to a temperature of between about 80 and 200° C. to form a stable dye. A second test must then be carried out to choose suitable image receiving compounds. The purpose of this test is to show whether the image producing compound will react sufficiently rapidly with the light-sensitive azide on exposure to light, so that, when the mixture is heated after it has been exposed, it will not produce a colored compound with the reactant in the image receiving layer.

Heavy metal compounds are suitable for use as reactants in the image receiving layer for the image producing hydroxylamine compounds, especially compounds of metals of the main Groups III to V and sub-Groups I and II of the Periodic System of Elements, e.g. compounds of the following heavy metals: cadmium, mercury, copper, silver, gold, bismuth or thallium. Salts of these metals with long-chained aliphatic carboxylic acids are especially suitable and the addition compounds of bismuth nitrate with amines, e.g. triethanolamine. Silver compounds which are substantially insensitive to light under the conditions of the copying process according to the invention have been found to be especially suitable, e.g. the silver salts described in U.S. Pat. No. 3,330,663 of aliphatic carboxylic acids which contain a thioether group or silver salts of long-chained fatty acids such as silver behenate, silver palmitate or silver stearate, etc.

Brown copies are generally obtained when using the above mentioned heavy metal compounds. The image consists of the metal used and/or a reaction product of the transferable image producing compound.

In addition to containing the image forming reactants themselves, the image receiving layers may contain other additives which avantageously affect the color tone, contrast and stability, etc. of the copy. Image receiving layers of this type are already known and have been described, e.g. in German Patent No. 895,101, in Dutch Pat. No. 277,086, Belgian Pat. No. 614,064 and in U.S. Pats. Nos. 3,080,254 and 3,446,648.

The usual sources of light used in reproduction work, such as mercury lamps, iodine quartz lamps or incandescent lamps may be used for exposing the light-sensitive layers according to the invention. The spectral sensitivity of the light-sensitive material depends on the nature of the azides used. Most organic azides are sensitive to ultraviolet light and partly also to blue light.

Transfer of the image producing compounds from the unexposed areas of the light-sensitive layers to the image receiving layer is carried out at elevated temperatures of between 80 and 200° C. Heating may be performed e.g. by passing the exposed light-sensitive layer in contact with the image receiving layer over hot plates or rollers or by irradiation with infra-red light. The suitable temperature and heating time depends, of course, on the nature of the image producing compound and can be determined by a few simple tests.

One special advantage of the light-sensitive system to be used according to the invention consisting of the organic azide and the image producing compound is that the system can be optically sensitized. This is not possible with the known materials, e.g. those described in U.S. patent specification 3,094,417.

Practically the same compounds which are used for the optical sensitization of silver halide emulsion layers may be used as sensitizers for the material according to the invention. That is to say, preferably cyanine dyes, merocyanines, oxonoles or rhodacyanines of many different types as described e.g. in the book by F. M. Hamer "The Cyanine Dyes and Related Compounds," 1964.

The nitrile substituted thioamide sensitizers or their homologous compounds such as the corresponding tetramethine compounds described in French Pat. No. 1,574,890 or U.S. application, Ser. No. 727,696 are also highly effective.

The technique of sensitization is also similar to that employed in silver halide photography. The sensitizers are dissolved in a suitable solvent such as short-chained aliphatic alcohols or aqueous systems and added to the layers before they are cast. The concentration of the optical sensitizers may vary within wide limits. Quantities of between 1 to 10 g. per mol of azide compounds have generally been found to be sufficient.

The most suitable sensitizers for a given system can easily be determined by the usual sensitometric tests customarily employed in the art of sensitizing silver halide emulsions.

The addition of sensitizers results not only in an increase in optical sensitivity but also in a considerable increase in speed which is especially desirable for achieving short copying times. Due to the possibility of sensitizing the layers according to the invention to the red and green regions of the spectrum as well, it is not only possible to obtain perfect copies of colored originals but also, by suitable choice of the image producing systems which yield dyes in the subtractive color components, to obtain copies with natural colors.

EXAMPLE 1

Light-sensitive material

A light-sensitive layer is prepared from 250 mg. of azide 14,
50 mg. of N-phenyl-N'-hydroxyurea,
10 ml. of methyl ethyl ketone,
5 ml. of a 10% solution of polyvinyl chloride in methyl ethyl ketone by applying the mixture on a paper support and drying.

Image receiving material

Ammonia is added to a solution of 5 g. of cupric chloride and 75 ml. of $H_2O$ until the precipitate formed redissolves and 30 ml. of 5% aqueous polyvinyl alcohol are then added and the solution is cast on paper and dried.

Processing

The light-sensitive layer is exposed through an original for 3 minutes, using a 75 watt mercury lamp at a distance of 20 cm., and it is then heated in contact with the image receiving material. A brown positive of the original is obtained. Instead of N-phenyl-N'-hydroxyurea, N-allyl- and N-ethyl-N'-hydroxyurea may be used with similar results.

EXAMPLE 2

Light-sensitive material

As described in Example 1.

Image receiving material 1 g. of bismuth nitrate is treated for 6 hours in a vibratory mill with 40 g. of a 1.5% solution of polyvinyl acetate in acetone and
26 g. of a 4% solution of acetyl celluose in acetone.

The mixture is cast on paper and dried.

Processing

The treatment is carried out as described in Example 1. A brown positive is obtained. 0.6 g. of thallium-(I) chloride or 0.8 g. of mercury-(II) bromide may be used instead of bismuth nitrate in the image receiving layer with equally good results.

EXAMPLE 3

Light-sensitive material

A light-sensitive layer is prepared from a solution of:

30 mg. of azide 37,
15 mg. of N-phenyl-N'-hydroxyurea,
10 ml. of methyl ethyl ketone, and
5 ml. of a 5% solution of ethyl cellulose in methyl ethyl ketone by casting on a layer support of paper and drying.

Image receiving material 2.1 g. of a mixture of silver behenate and behenic acid in a molar ratio of 1:1 are ground in a vibratory mill for 6 hours with 80 g. of a 1.5% solution of polyvinyl acetate in acetone and 53 g. of 4% solution of acetyl cellulose in the same solvent with the addition of 0.9 g. of 1-oxo-1,2-dihydrophthalazine, 8.4 g. of ZnO and 1.4 g. of coumarone-indene resin. The mixture is applied to a paper support and dried, Processing The material is exposed and processed as described in Example 1. A brown positive is obtained. Other systems may be used instead of azide 27 and instead of the above image producing compound. The results of such experiments are summarised in the following table.

| Azide (Table 1) | Image producing compound (Table 2) | Colour of the copy |
|---|---|---|
| 14 | 2 | Brown. |
| 14 | 6 | Do. |
| 13 | 4 | Do. |
| 30 | 4 | Do. |
| 39 | 4 | Do. |
| 37 | 4 | Do. |
| 19 | 4 | Do. |
| 14 | 3 | Do. |
| 14 | 5 | Do. |
| 14 | 1 | Pale brown. |
| 14 | 4 | Brown. |
| 14 | 12 | Do. |

If the light-sensitive layers contain azides which absorb light from the longer wave region (e.g. azide 14, 19 and 39, etc.), exposure may also be carried out with light sources which emit longer wave light, e.g. iodine quartz lamps.

Instead of silver behenate, other silver compounds may also be used, e.g. silver stearate or silver salts of octadecylmercapto acetic acid or 2-octadecylmercapto-5-carboxymethylmercapto-1,3,4-thiadiazole (as described in U.S. Pat. No. 3,330,663), etc. The choice of suitable compounds depends on the purpose of use and the desired image tone.

EXAMPLE 4

The sensitizers shown in the following table are added to the mixture prepared from:

30 mg. of azide 14,
15 mg. of N-phenyl-N'-hydroxyurea,
10 ml. of methyl ethyl ketone,
5 ml. of a 10% polyvinyl chloride solution in methyl ethyl ketone and the mixture is applied to a paper support dried.

The layer is exposed behind a $\sqrt{2}$ step wedge for 60 seconds, using a 650 watt iodine quartz lamp, and heat transfer is carried out as described in Example 3. Step wedges of the samples obtained in this way show, by their higher number of visible steps than those obtained under the same conditions with an unsensitised control sample, the increase in sensitivity obtained by the addition of sensitiser. The results are shown below.

| Sensitizer | Step Number |
|---|---|
| 1. Control sample | 3 |
| 2. 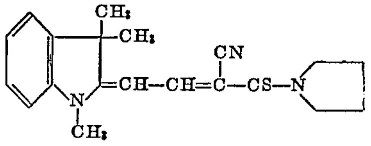 | 10 |
| 3. 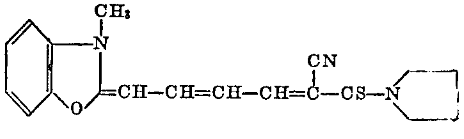 | 12 |

4. 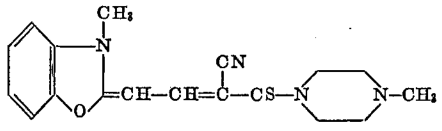

We claim:

1. In a process for making copies by imagewise exposure of a light-sensitive layer which contains a light-sensitive compound and an image producing compound which can be transferred upon heating to an image receiving layer, the image producing compound in the exposed areas being converted into a non-transferable compound upon reaction with the light-sensitive compound, bringing the exposed layer into contact with an image receiving layer which contains compounds capable of reacting with the image producing compound to form colored reaction products, and heating the layers while in contact to a temperature at which the image producing compound is transferred from the unexposed areas of the light-sensitive layer to the image receiving layer, the improvement consisting of exposing a light-sensitive layer which contains as the light-sensitive compound an organic azido compound selected from the group consisting of heteorcyclic or aryl azide, carbonyl-azide and sulfonyl-azide and as the image producing transferable compound a hydroxylamine derivative of the following formula:

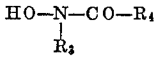

$R_3$ represents hydrogen or alkyl $R_4$ represents alkoxy containing up to 5 carbon atoms, or aryloxy, amino, alkylamino or arylamino having a melting point of above 50° C. which can be transferred at a temperature of between 80 and 200 and a silver compound that has a low sensitivity to light during said transfer step.

2. The process of claim 1, wherein the oragnic azido compound has the formula:

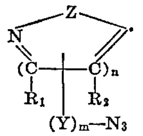

wherein

Z=the ring members necessary for completing an oxazole, thiazole, selenazole, imidiazole, pyridine, pyrrole or pyrimidine ring, which may contain a fused benzene or naphthalene ring;

Y=phenylene, phenylene carbonyl methylene;

$R_1$ or $R_2$=hydrogen, a saturated or olefinically unsaturated aliphatic group having up to 5 carbon atoms, a phenyl group, amino, halogen, hydroxy, alkoxy, carboxyl, esterified carboxyl, carbamoyl, sulfo, sulfonamido or nitril;

$R_1$ and $R_2$ toegther may represent the ring members necessary for completing a fused benzene or naphthalene ring;

$n$=0 or 1 and $m$=0 or 1.

3. The process of claim 2, wherein the organic azido compound is a compound of the 9-azido acridine, 9-azido-2,3-benzoacridine or 4-azidoquinoline series.

4. The process of claim 1, wherein the light-sensitive layer contains compounds which optically sensitive the system of organic azido compounds and image producing compounds.

5. The process of claim 4, characterized in that the light-sensitive layer contains a polymethine dye as the sensitizer.

6. The process of claim 5, wherein the light-sensitive layer contains a sensitizer of the following formula:

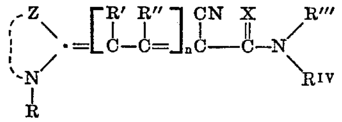

wherein

X=sulfur or selenium;

Z=the non-metallic ring members necessary for completing a 5- or 6-membered heterocyclic ring which may contain an anellated benzene or naphthalene ring;

R=a saturated or olefinically unsaturated aliphatic group, cycloalkyl, aralkyl or phenyl;

R′, R″=hydrogen or alkyl;

R‴, $R^{IV}$=hydrogen, a saturated or olefinically unsaturated aliphatic group, cycloalkyl, aryl, aralkyl or a heterocyclic group, R‴ and $R^{IV}$ together may represent the ring members necessary for completing a saturated 5-, 6- or 7-membered heterocyclic ring;

$n$=1 or 2.

7. The process of claim 1, wherein the image receiving layer contains the silver salts of a long-chained aliphatic carboxylic acid containing from 8 to 24 carbon atoms.

8. The process of claim 6, wherein the image receiving layer contains a silver salt of an aliphatic carboxylic acid which is substituted with a thioether group.

9. Light-sensitive photographic material having a light-sensitive layer which contains a light-sensitive organic azido compound selected from the group consisting of heterocyclic or arylazide, carbonylazide and sulfonylazide and in addition, as an image producing compound which is transferable at a temperature of between 80 and 200° C., a hydroxylamine derivative of the following formula:

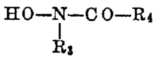

in which $R_3$ represents hydrogen or alkyl, and $R_4$ represents alkoxy containing up to 5 carbon atoms, aryloxy, amino, alkylamino or arylamino having a melting point of about 50° C.

10. The material of claim 9, wherein the organic azido compound has the formula

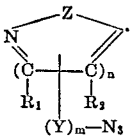

wherein

Z=the ring members necessary for completing an oxazole, thiazole, selenazole, imidazole, pyridine, pyrrole or pyrimidine ring, which ring may contain a fused benzene or naphthalene ring;

Y=phenylene, phenylene carbonyl methylene;

$R_1$ or $R_2$=hydrogen, a saturate or olefinically unsaturated aliphatic group having up to 5 carbon atoms, a phenyl group, amino, halogen, hydroxy, alkoxy, carboxyl, esterified carboxyl, carbamoyl, sulfo, sulfonamido or nitril;

$R_1$ and $R_2$ together may represent the ring members necessary for completing a fused benzene or naphthalene ring;

$n$=0 or 1 and $m$=0 or 1.

11. The material of claim 9, wherein the light-sensitive azido compound is a compound of the 9-azidoacridine, 2,3-benzoacridine or 4-azidoquinoline series.

12. Light-sensitive material of claim 9, wherein the light-sensitive layer contains a compound which optically sensitizes the system of the light-sensitive azide and the image producing compound.

13. Light-sensitive material of claim 9, wherein the light-sensitive layer contains a polymethine dye as sensitizer.

14. Light-sensitive material of claim 12, wherein the light-sensitive layer contains a sensitizer of the following formula:

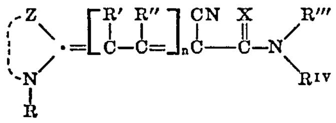

wherein

X=sulfur or selenium;

Z=the non-metallic ring members necessary for completing a 5- or 6-membered heterocyclic ring which may contain an anellated benzene or naphthalene ring;

R=a saturated or olefinically unsaturated aliphatic group, cycloalkyl, aralkyl or phenyl;

R', R''=hydrogen or alkyl;

R''', $R^{IV}$=hydrogen, a saturated or olefinically unsaturated aliphatic group, cycloalkyl, aryl, aralkyl or a heterocyclic group, R''' and $R^{IV}$ together may represent the ring members necessary for completing a saturated 5-, 6- or 7-membered heterocyclic ring;

$n$=1 or 2.

References Cited

UNITED STATES PATENTS

| | | | |
|---|---|---|---|
| 2,747,999 | 5/1956 | Yutzy et al. | 95—88 |
| 3,282,693 | 11/1966 | Sugura et al. | 96—49 |

NORMAN G. TORCHIN, Primary Examiner

J. L. GOODROW, Assistant Examiner

U.S. Cl. X.R.

96—77